United States Patent [19]

Unsworth et al.

[11] Patent Number: 5,008,608
[45] Date of Patent: Apr. 16, 1991

[54] CONTROLLER FOR STARTING AND STOPPING ELECTRIC MOTORS

[75] Inventors: Peter J. Unsworth, Lewes, England; John C. Merrison; Timothy M. Rowan, Wauwatosa, both of Wis.

[73] Assignee: Allen-Bradley Company, Inc., Milwaukee, Wis.

[21] Appl. No.: 456,910

[22] Filed: Dec. 26, 1989

[51] Int. Cl.$^5$ .............................................. H02P 5/40
[52] U.S. Cl. ................................... 318/729; 318/805; 318/812
[58] Field of Search ........ 318/729, 739, 778, 798–803, 318/805, 806, 807, 811, 812

[56] References Cited

U.S. PATENT DOCUMENTS

| | | |
|---|---|---|
| 4,052,648 | 10/1977 | Nola . |
| 4,259,845 | 4/1981 | Norbeck ............................ 318/808 |
| 4,355,274 | 10/1982 | Bourbeau .......................... 318/729 |
| 4,417,190 | 11/1983 | Nola . |
| 4,439,718 | 3/1984 | Nola . |
| 4,447,788 | 5/1984 | Mundt et al. ...................... 318/799 |
| 4,459,529 | 6/1984 | Johnson . |
| 4,469,998 | 9/1984 | Nola . |
| 4,482,853 | 11/1984 | Bhavsar . |
| 4,489,264 | 12/1984 | Dabney . |
| 4,581,568 | 4/1986 | Fitzpatrick et al. . |
| 4,628,241 | 12/1986 | Bristow et al. . |
| 4,704,570 | 11/1987 | Hopkins . |
| 4,823,066 | 4/1989 | Fujika et al. ...................... 318/806 |

Primary Examiner—William M. Shoop, Jr.
Assistant Examiner—John W. Cabeca
Attorney, Agent, or Firm—Quarles & Brady

[57] ABSTRACT

A three-phase motor is operated by a controller having sets of thyristors which trigger electricity from each phase of a supply to the motor. The controller measures the interval $\phi$ between the voltage and the current when one phase of the motor makes a zero crossing and measures the interval $\gamma$ when the thyristors are non-conductive during a half-cycle of the voltage for one phase. A control angle $\theta$ is calculated according to the equation $\theta = \phi + K\gamma$, where K is a positive number. The control angle $\theta$ is compared to a reference value to derive an error value. The times at which the thyristors are triggered is controlled in response to the error value. To start the motor, the reference value is gradually decreased to trigger the thyristors progressively earlier during each half cycle of the supply voltage. To stop the motor, the reference value is gradually increased to trigger the thyristors progressively later during each half cycle of the supply voltage.

22 Claims, 5 Drawing Sheets

CONTROLLER FOR STARTING AND STOPPING ELECTRIC MOTORS

BACKGROUND OF THE INVENTION

The present invention relates to devices for controlling the application of power to AC electric motors; and in particular to such devices which control the starting and stopping of the motor.

A typical motor controller has thyristors which connect the motor windings to alternating current supply lines. For a three phase motor, each AC phase line usually is coupled to a separate winding within the motor by either a triac or a pair of inversely connected silicon controller rectifiers (SCR's). A circuit within the controller determines the proper time to trigger the thyristors during each half-cycle of the supply line voltage. Once a thyristor is triggered it remains in a conductive state until the alternating current flowing therethrough makes a zero crossing. By regulating the trigger time of the thyristors, the amount of time that they are conductive can be varied to control the amount of current applied to the motor and correspondingly its speed.

To start the motor, conventional motor controllers vary the thyristor trigger times to provide a gradual increase in the voltage. In doing so, the thyristors are initially triggered relatively late in each voltage half cycle so that they are conductive for only a short period. The trigger times then become progressively earlier in each half cycle to render the thyristors conductive for longer periods and apply greater amounts of voltage to the motor.

Figure 1:
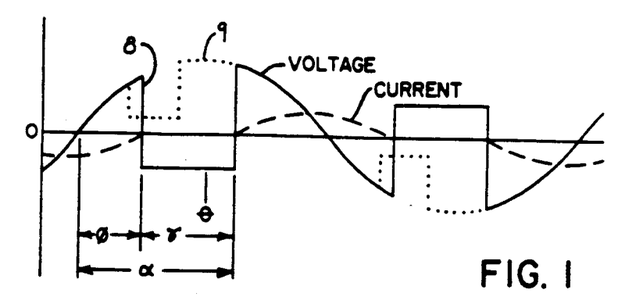
FIG. 1 is waveform diagram of the current and voltage applied to one phase winding of an electric motor.

This control of electricity to the motor is graphically depicted by the waveforms in FIG. 1. The solid waveform represents the alternating voltage between a terminal for one winding of the motor and ground, while the dashed waveform represents the current through that winding. When the current reaches zero, the thyristors for that winding will automatically turn off creating a notch 8 in the voltage waveform until the thyristors are triggered again. It is noted that the voltage is not zero during this non-conductive period, due to a voltage induced across the motor winding from the back electromotive force (emf) and from the current in the other motor windings. When the motor is initially started, notch in each half cycle is relatively wide and the voltage during the notch interval has the opposite polarity to that of the supply voltage. This opposite polarity relationship exists while the motor is in a stall condition.

As the thyristors become triggered earlier in each half cycle during starting, the motor speed increases until it reaches substantially full speed, at which point the motor is no longer in a stall condition. When this occurs, the voltage across the winding during the notch has the same polarity as the supply line voltage as depicted by the dotted line 9. Eventually the thyristors are triggered immediately after the current goes to zero and are conductive during almost the entire half cycle of the voltage.

Various techniques have been devised for controlling the thyristor triggering, and thereby the application of electricity to the motor during starting. One common technique involves sensing the zero crossing of the supply line voltage and delaying an angle $\alpha$ between that crossing and the voltage phase angle at which the thyristor is triggered. Since the voltage waveform is periodic (see FIG. 1), the delay angle $\alpha$ can be expressed as an interval of time commencing at the zero crossing. By initially starting with a large delay angle $\alpha$ and slowing decreasing the delay, a greater amount of voltage is gradually applied to the motor until the thyristor is conductive during substantially the entire half cycle of the supply voltage. Another common technique for triggering the thyristors controls the hold-off angle $\gamma$ between the voltage phase angle at which the current reaches zero and the phase angle when the thyristors are triggered. As with $\alpha$ control, the control system expresses angle $\gamma$ as an interval of time from when the motor current goes to zero. Once again, by starting with a relatively large hold-off angle $\gamma$ and gradually decreasing it, the electricity to the motor is increased producing a commensurate increase in torque.

Both of these control techniques involve open loop systems in which a condition (zero voltage or zero current) is detected and the thyristors are triggered at an interval measured from that condition. Although the starting techniques that regulate angles $\gamma$ or $\alpha$ work well with motors driving a load that is independent of the speed, these techniques have less than optimum performance when the load torque varies as a function of speed. In motors which operate pumps for example, the load torque may increase as the square of the motor speed. In this situation, conventional "soft" motor starting techniques as described above create sudden flow surges of the pumped fluid which adversely effect the plumbing on both sides of the pump. Pipe vibration during the pump starting is a common side effect, which if left unchecked can cause ruptures over time. Therefore, it is desirable to provide a control mechanism which gradually and uniformly increases the motor torque as the motor starts preventing a sudden, sizeable speed change.

A control technique similar to $\gamma$ or $\alpha$ starting systems has been utilized to regulate the power factor of the motor under varying load conditions once the motor has reached full speed. U.S. Pat. No. 4,052,648 discloses an example of power factor regulation in which the conduction time of each thyristor switch is controlled to be inversely proportional to the phase angle difference $\phi$ between the zero crossing of the voltage applied to the motor and the cessation of current flow. By controlling the time at which the thyristors are triggered on, more or less current is applied to the motor which alters the phase angle difference. However, unlike $\alpha$ and $\gamma$ control, the power factor control cannot directly determine the time at which to trigger the thyristor from the sensed events, since the angle $\phi$ being controlled does not terminate at the triggering time. Instead, power factor control must be implemented by a closed feedback loop, wherein the error between the desired and actual values for angle $\phi$ is used to determine the triggering time.

SUMMARY OF THE INVENTION

A motor controller includes thyristors which couple the motor windings to electrical supply lines. The thyristors are triggered into a conductive state by a control circuit to apply electricity to the motor. By sequentially altering the relative times at which the thyristors are triggered, the conduction time can be varied to cause an increase or decrease in the torque of the motor.

The increase and decrease of motor torque is controlled so that the difference between the load torque and the motor generated torque does not exceed tolerable limits and does not change too rapidly. The motor controller, which regulates the application of electricity to achieve this torque relationship, senses the zero crossings of both the voltage and current applied to the motor. From these sensed events, the phase angle difference $\phi$ and the voltage phase angle $\gamma$ during which the thyristors are non-conducting are measured. The measured angles are used to derive a control angle $\theta$ according to the equation $\theta = \phi + K\gamma$, where K is greater than zero. The controller compares to computed value of $\theta$ to a reference value and alters the thyristor triggering time in an attempt to bring the two values into coincidence. During the starting of the motor, the reference value for $\theta$ is decreased gradually which results in the thyristors being triggered at progressively shorter intervals. Conversely, in order to stop the motor, the reference value for $\theta$ is increased causing each thyristor to be triggered at progressively longer intervals.

A general object of the present invention is to regulate the increase and decrease in motor torque to avoid rapid changes in speed, especially when the load torque varies with motor speed.

A more specific object is to regulate the application of electricity to the motor by controlling the phase angle of a reference point with respect to the alternating voltage across the motor. For example, this reference point may occur during which time the thyristors controlling the electricity to the motor are nonconducting.

Yet another object of the present invention is to provide a motor controller which will regulate the torque of the motor by altering the thyristor triggering to gradually increase or decrease the phase angle of the reference point.

DETAILED DESCRIPTION OF THE INVENTION

Figure 2:
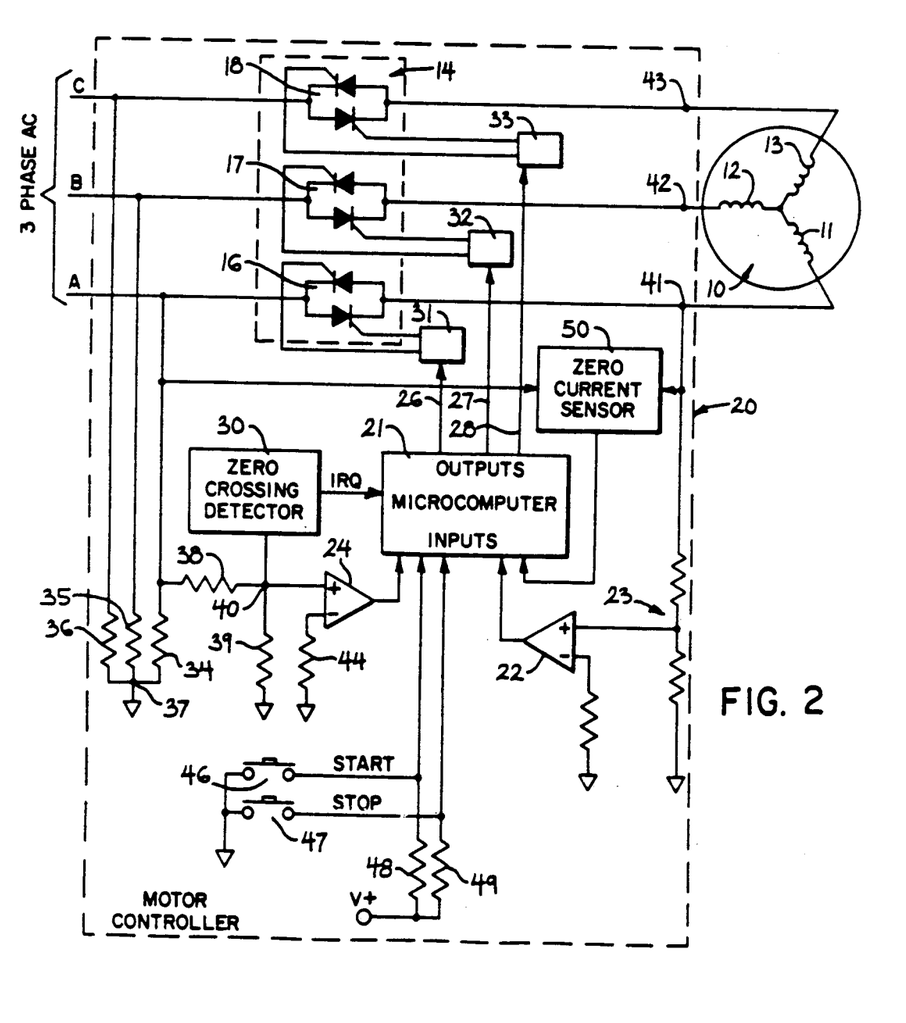
FIG. 2 is a schematic diagram of a motor control circuit for practicing the present invention.

The present invention will be described in the context of the exemplary motor controller 20 shown in FIG. 2. A three-phase motor 10 has three stator windings 11-13, which are connected to a source of three-phase alternating electricity by a thyristor switch module 14 and three supply lines designated A, B, and C. The switch module 14 has three pairs of inverse-parallel connected SCR's 16, 17, and 18. The SCR's in each pair couple one of the supply lines A, B, or C to a different stator winding 11, 12, or 13, respectively. Depending on the level of current to be controlled, a triac can be used in place of each pair of SCR's.

The SCR pairs 16-18 are triggered, or fired, by a control circuit that includes a microcomputer 21, a pair of voltage comparators 22 and 24, a zero voltage crossing detector 30 and a zero current sensor 50. The microcomputer 21 may be one of several commercially available types which contain a timer circuit, a read only memory, and a random access memory in the same integrated circuit package. The program for controlling the operation of the motor controller 20 is stored in the read only memory and will be described in greater detail with respect to the operation of the motor controller. The microcomputer 21 generates properly timed thyristor trigger pulses on three lines 26, 27, and 28 of a parallel output port. Each trigger pulse is relatively short being just long enough to place the SCR's in a conductive state, at which they remain until the magnitude of the alternating current flowing through the SCR's goes to zero. The first output line 26 is coupled by a first pulse transformer 31 to the gate terminals of the first pair of SCR's 16 for electricity supply line A. The other trigger output lines 27 and 28 are coupled by similar pulse transformers 32 and 33 to the gate terminals of the second and third SCR pairs 17 and 18, respectively, for electricity supply lines B and C.

The motor stator windings 11-13 are connected to the controller circuit 20 at three terminals 41, 42, and 43. A first voltage comparator 22 is coupled to the first terminal 41 by voltage divider 23 and senses the polarity of the voltage at that terminal with respect to the circuit ground, which is substantially at the same potential as the neutral of the electricity supply (not shown). The output signal from the first voltage comparator 22 is applied to a line of an input port of the microcomputer 21.

Three equal value resistors 34, 35 and 36 connect the supply lines A, B and C to the circuit ground at node 37. The voltage across each of the resistors 34-36 respectively equals the voltage Va, Vb and Vc between the corresponding phase supply line and the neutral of the supply. The "Y" connection of the resistors 34-36 reconstructs the potential of the supply neutral at node 37 and the circuit ground. A voltage divider consisting of resistors 38 and 39 extends between supply line A and ground to provide a reduced voltage at intermediate node 40 which corresponds to phase voltage Va. The non-inverting input of the second voltage comparator 24 is connected to node 40 and its inverting input is coupled to circuit ground by resistor 44. The output signal of the second voltage comparator 24 indicates the polarity of the A supply line voltage Va and is applied to an input port line of the microcomputer 21. The reduced voltage at node 40 is also connected to a zero crossing detector 30 which senses when the A supply line voltage Va goes through zero. The output signal from the zero crossing detector 30 is connected to an interrupt input (IRQ) of the microcomputer 21.

A zero current sensor 50 is connected to supply line A and to the first motor terminal 41 to detect when the current in supply line A becomes zero. When the alternating current flowing through an SCR goes to zero, the SCR turns off until another trigger pulse is applied to its gate electrode. Therefore, by sensing when the voltage across the SCR substantially exceeds the typical on-state voltage drop for the device, the zero current sensor 50 can detect when the SCR has turned off. In response, a signal indicating the zero current condition is applied to an input port line of the microcomputer 21.

Two additional microcomputer input port lines are connected to manual pushbutton switches 46 and 47 and to the positive voltage supply for the motor controller 20 by pull-up resistors 48 and 49. Activation of these switches 46 and 47 pulls the corresponding microcomputer input line to ground. The first switch 46 is activated to start the motor 10, while the second switch 47 initiates the stopping function.

When the operator presses the start switch 46, the microcomputer 21 begins executing a software routine of its control program which triggers the SCR's to gradually increase the voltage applied to the motor. The operation of the motor controller in the start mode will be described with reference to the graph of the motor speed in FIG. 3 and the flowchart of the software routine in FIGS. 4A and 4B. To facilitate the description of the starting technique, only the steps of the software routine which control the current between two of the AC supply lines (A and B) are depicted in the flowchart. It is readily appreciated that to control the flow of current between supply lines B and C and between supply lines C and A during each half cycle supply voltage, the combinations of SCR's for those lines are triggered at delays of 60 and 120 electrical degrees, respectively, from the trigger times for conducting current between supply lines A and B. Alternatively, the voltage and current zero crossings in each supply line can be sensed and the steps of this flowchart can be duplicated to control the flow of electricity between supply lines B and C and between supply lines C and A.

Figure 4A:
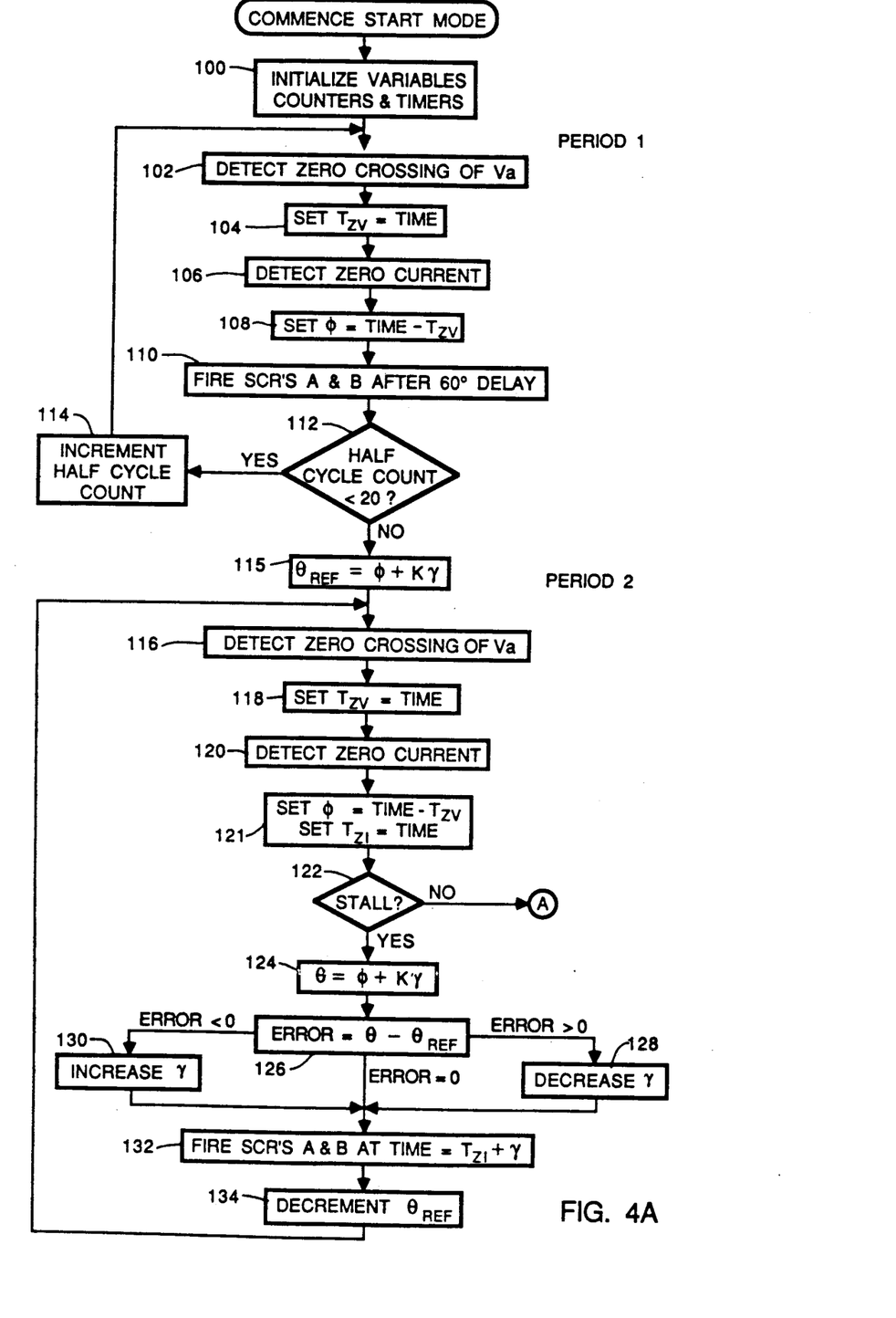
FIGS. 4A and 4B are a flowchart of the motor control circuit operation which starts the motor.

The start mode is divided into three phases which correspond to the phases of the controller's operation as defined by portions of the software program which controls the starting operation. When the start switch is closed at time $T_0$, the program execution begins at step 100 with the microcomputer 21 initializing the variables, counters and timers which are utilized in the course of the program execution. Once the initialization has been accomplished, the program execution enters period 1 at step 102 where the microcomputer waits until an interrupt is received on line IRQ from the zero crossing detector 30. When a zero crossing of voltage Va occurs, a variable designated $T_{zv}$ is set equal to the present value of the timer within microcomputer 24 at step 104 to provide an indication of the relative time at which the zero crossing occurred.

The program execution then advances to step 106 where the microcomputer 21 waits for a signal from the zero condition sensor 50 indicating that the pair of SCR's 16 in supply line A have turned off. Upon receiving the zero current signal, a variable designated $\phi$ is set equal to the difference between the present value of the microcomputer timer and the previously stored value $T_{zv}$ at step 108 to provide a measurement of the interval between the zero voltage crossing and the zero current event.

> During period 1 of the starting operation, the SCR's are triggered at a fixed interval from the zero current event. For example, this interval is set to sixty electrical degrees. As a consequence, the microcomputer 21 times an interval equal to sixty electrical degrees from the zero current indication and then issues trigger pulses on output lines 26 and 27 which fire the pairs of SCR's 16 and 17 for supply lines A and B at step 110. Alternatively in this initial period, the SCR's can be triggered at a constant interval from when the phase voltage Va makes a zero crossing, which for practical purposes in this period is equivalent to triggering at a fixed interval from the zero current crossing.

Period 1 of the starting operation lasts for ten cycles of the supply line voltage Va. At step 112, a count of the voltage half cycles, which is stored in the memory of the microcomputer 21, is checked to determine if twenty half-cycles have occurred. When the count is less than twenty, the program branches to step 114, where the half cycle count is incremented before the program execution returns to step 102 in order to apply electricity to the motor during the next half cycle of the supply voltage. Once period 1 has been active for ten cycles of the AC voltage at time $T_1$, the program execution advances to step 115 where an initial reference value $\theta_{REF}$ is calculated using the equation $\theta_{REF} = \phi + K\gamma$. At this time, variable $\phi$ has the value determined at the last execution of step 108 and the trigger delay of sixty degrees from step 110 is used for the value of $K\gamma$.

Then the program enters period 2, where it awaits the detection of another zero crossing in phase voltage Va as indicated by zero crossing detector 30 at step 116. When a zero crossing is found, the microcomputer sets a variable $T_{zv}$ equal to the present value of the timer at step 118, thereby recording the relative time at which the zero crossing occurred. The microcomputer 21 then awaits a signal from the zero current sensor 50 at step 120, indicating that the SCR's have turned off at the end of the current flow through phase A. When the zero current is detected, the variable $\phi$ is set equal to the difference between the present value of the microcomputer timer and variable $T_{zv}$, at step 121, to provide a measurement of interval between the zero voltage and current crossings. The relative time at which the current goes to zero also is stored as variable $T_{zI}$.

> Then, while the pair of SCR's 16 is turned off, the polarities of the A supply line voltage and the voltage between the first stator winding 11 and circuit ground are compared at step 122. The polarity of the first stator winding voltage is represented by the output of comparator 22 and the polarity of the A supply line voltage is represented by the output of comparator 24. As noted previously, these voltages have opposite polarity with respect to the electrical supply neutral (circuit ground) when the motor is in a stall. As long as the motor speed is significantly less than full speed, the motor will be in a stall and the program remains in period 2 by advancing to step 124. The exact stall transition point varies from motor to motor.

During this period, the voltage phase angle at which the SCR's are triggered is gradually changed to increase the motor torque. This is accomplished by calculating the value of a control angle $\theta$ and comparing the value to a reference $\theta_{REF}$ to provide an error signal. This error signal then is employed to increase or decrease the SCR's triggering time in a manner which prevents the width of the notch in voltage waveform from changing too rapidly. This insures stability in the acceleration of the motor so that a sudden variation in the motor speed does not occur.

The control angle $\theta$ is derived from the equation $\theta = \phi + K\gamma$ where K has a value greater than zero, which in the starting mode is 0.75, for example. This preferable value of K defines a control angle $\theta$ at a point within the notch of the voltage waveform for the first stator winding 11, as illustrated in FIG. 1. However, the value for K can be chosen to place the control angle $\theta$ at other locations depending upon the desired motor control effect. Values for K which are greater than one also can be used, thereby weighting $\gamma$ with respect to $\phi$ in the derivation of the control angle $\theta$.

To accomplish this starting control function, the microcomputer 21 calculates the control angle $\theta$ at step 124 using the equation given previously herein. For the first pass through the program loop for period 2, a value of sixty degrees is used for $\gamma$, thereby corresponding to the trigger delay used in period 1. However, calculation of the control angle $\theta$ during subsequent voltage half cycles, at step 124, uses a value of $\phi$ determined during that half cycle, and a value used for $\gamma$ determined during the previous half cycle.

Figure 4B:
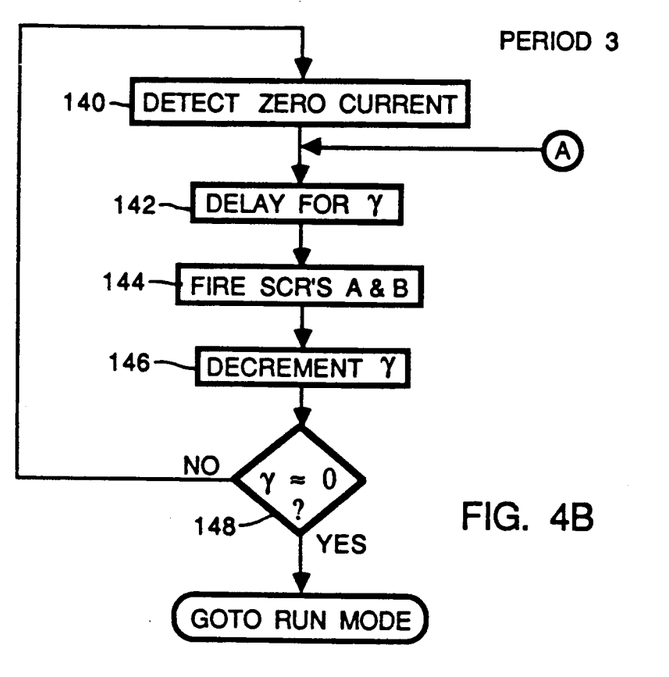

Once a value for the control angle $\theta$ has been calculated by the microcomputer 21, it is compared to the reference value $\theta_{REF}$ at step 126 and the difference between them produces an error value. If the error is not equal to zero, the value for variable $\gamma$ will be altered. During motor starting, $\theta_{REF}$ often will be less than the calculated value for $\theta$, thereby producing a positive error value. When this occurs, the program execution will branch to step 128 where the value of $\gamma$ is decreased, for example by an amount equal to one-eighth or one-sixteenth of the error value. Decreasing $\gamma$ shortens the voltage phase angle at which the SCR's are triggered, providing a sequential increase in the conduction time of the SCR's. However, if the motor torque is increasing at too rapid a rate, the error signal will have a negative value (i.e. $\theta$ is less than $\theta_{REF}$). In this case, the program execution branches to step 130 where the value for $\gamma$ is increased to lengthen the phase angle at which the SCR's are triggered in order to reduce the magnitude of the motor torque. For example the trigger angle can be increased by an amount equal to one-eighth or one-sixteenth of the error value. In the situation where the calculated control angle $\theta$ equals the reference value $\theta_{REF}$ (a zero error value), no alteration of $\gamma$ occurs and the program advances directly from step 126 to step 132.

Once the present value for $\gamma$ has been determined, the controller waits at step 132 to fire the SCR's for phase lines A and B until an interval equal to $\gamma$ occurs from the time $T_{ZI}$ when the current magnitude went to zero. When this interval has elapsed at step 132, the microcomputer 21 applies trigger pulses to output lines 26 and 27 so that the SCR pair 16 and 17 for supply lines A and B will become conductive. Thereafter at step 134, the value for $\theta_{REF}$ stored in the memory of the microcomputer is decremented. The decremental amount is determined by the speed at which the motor is to accelerate and is user selectable. The flowchart of the motor controller operation during the start mode is indicated as changing the value for $\theta_{REF}$ during every pass through the portion for period 2. However, for a more gradual acceleration of the motor, $\theta_{REF}$ may be altered less frequently, for example only once during every one to ten cycles of the supply voltage $V_a$. Once the new value for $\theta_{REF}$ has been calculated and stored in memory, the program execution returns to step 116 to make another pass through the loop for period 2.

Figure 3:
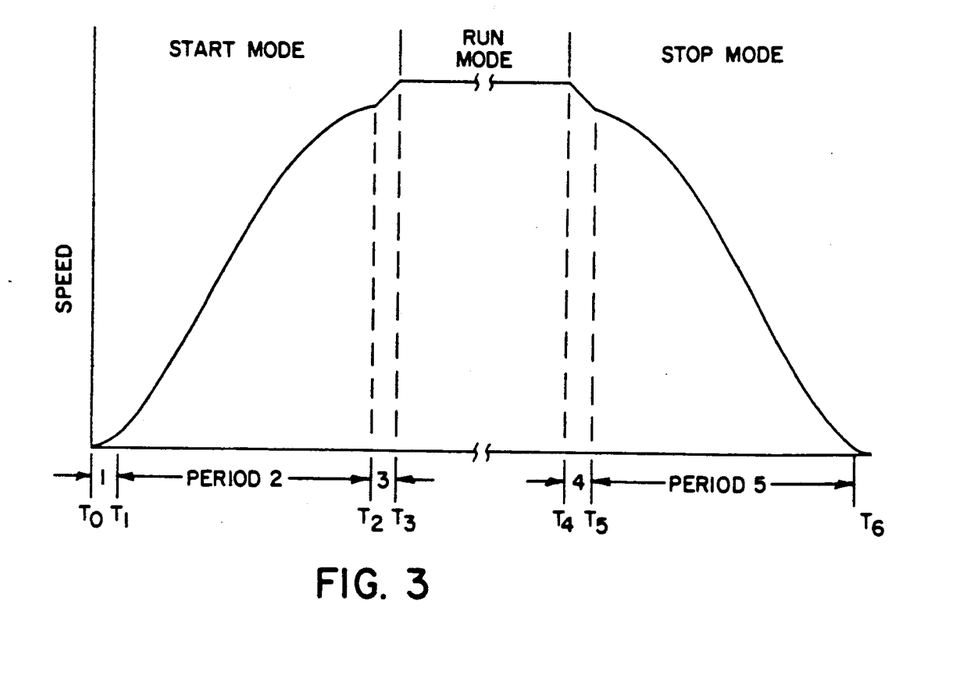
FIG. 3 graphically depicts the change in motor speed with time during starting and stopping modes.

During period 2, the motor speed increases so that at time $T_2$ in FIG. 3 it is substantially at its full speed and the motor is no longer in a stall state. At this point, the width of the notch in the voltage waveform may be rapidly closed without producing a rapid change in motor torque. In order to accomplish this, the program enters period 3 by branching from step 122 to step 142. Since a zero current crossing was just detected at step 120, the microcomputer 21 merely delays for an interval equal to the present value of $\gamma$ at step 142 and then issues trigger pulses to fire the SCR pairs 16 and 17 for phase lines A and B at step 144.

The value of $\gamma$ then is decremented by a given amount at step 146. At step 148, the new value of $\gamma$ is tested to determine if it approximately equals zero as will occur when the notch in the voltage waveform has substantially closed. If the value of $\gamma$ is not approximately zero, the program loops back to step 140 to wait for another zero current crossing, fire the SCR's again, and close the voltage notch further. In period 3 the SCR triggering times are altered without using the control angle $\theta$. Once the notch has substantially closed, the motor starting program branches from step 148 to a conventional software routine for controlling the operation of the motor at its full running speed.

Figure 5:
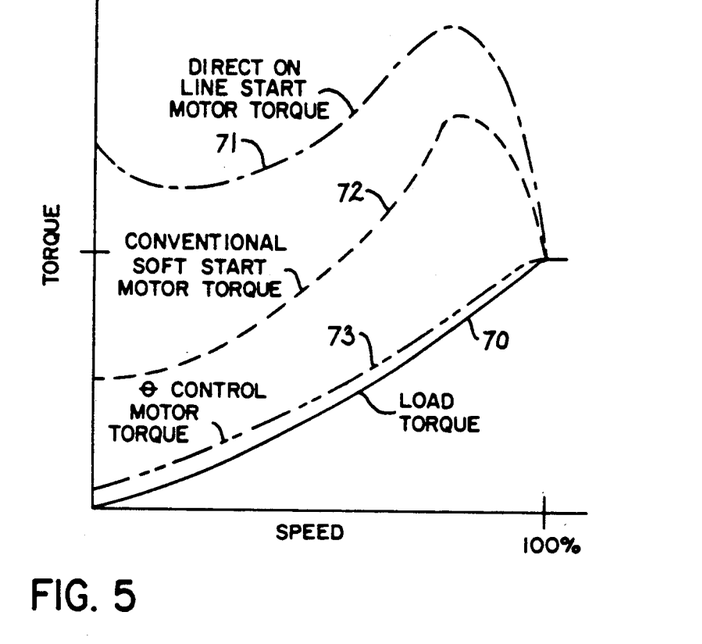
FIG. 5 is a graph of torque versus motor speed during motor starting.

FIG. 5 illustrates a comparison of the motor torques produced by different starting techniques. The solid line 70 in the drawing represents a load torque which varies with motor speed, such as the load from a fluid pump. The top curve 71 represents the torque generated by a motor that is connected to the supply lines by a set of contactors. A contactor simply switches the full supply voltage across the windings to start the motor. In this case, the motor torque rises rapidly as the motor approaches full speed and then drops suddenly to equal the load torque at full speed.

The middle curve 72 shows the motor torque developed during a conventional "soft starting" technique. Here too the torque rises quickly just prior to full speed and then decreases abruptly. These abrupt changes in the motor torque cause sudden changes in the fluid flow and cause hammering in the plumbing system.

The lower motor torque curve 73 represents the torque generated by the present method using $\theta$ angle control. Not only is an abrupt torque change eliminated, but this method provides a more uniform increase in motor torque. The motor torque also is maintained at a smaller increment above the load torque. All of these factors contribute to a smoother acceleration of the motor. This control minimizes sudden flow changes in pumps and the hammering caused by such rapid changes.

In addition to controlling the start of the motor to prevent sudden surges in motor torque, the present controller system can be utilized to bring the motor to a stop in a manner which also prevents large surges in motor torque. As with starting the motor, the stopping technique is divided into different periods of controller operation. With reference to FIG. 3, the controller enters the stopping mode at time $T_4$ by the operator depressing control switch 47 to signal the microcomputer 21 that the motor is to be stopped. Between times $T_4$ and $T_5$, the controller 20 is in period 4 during which time the voltage phase angle at which the SCR's are triggered is reduced by a constant incremental amount. After the motor begins to stall at time $T_5$, the operation of the controller 20 enters period 5 in which the firing time for the SCR's is determined by a close loop control system which is based upon regulating the control angle $\theta$. As will be described in detail, the regulation of control angle $\theta$ to stop the motor is similar to that employed during starting, except the value for $\theta_{REF}$ is gradually increased to produce an error signal which is then employed to regulate the gradual increase in the firing angle for the SCR's.

Figure 6:
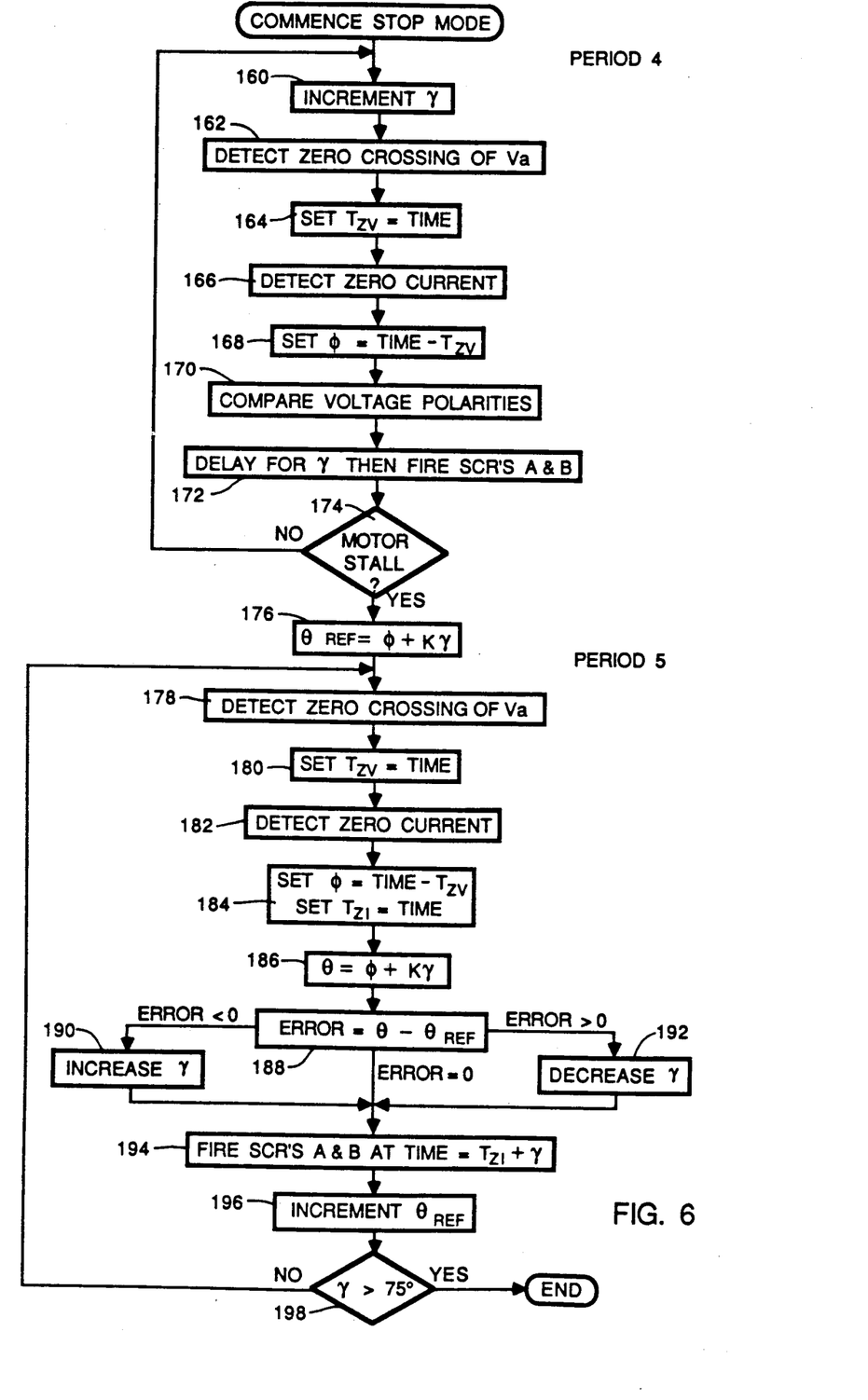
FIG. 6 is a flowchart of the motor control circuit operation to stop the motor.

When the motor controller 20 enters the stop mode, the microcomputer 21 commences executing a software routine represented by the flowchart in FIG. 6. Initially, at step 60, the value of γ, previously used in the run mode, is incremented; before waiting for a zero crossing of the voltage Va of supply line A to occur at step 162. The time at which the zero voltage crossing occurs is stored as variable $T_{zv}$ at step 164. Then, the program execution waits for an input from the zero current sensor 50 at step 166 indicating that the alternating current flowing through supply line A has reached zero. The microcomputer 21 then at step 168 records the interval between the zero voltage and zero current crossings as φ by subtracting the variable $T_{zv}$ from the present value of the microcomputer's internal timer. The relative time at which the current goes to zero is recorded as variable $T_{zI}$.

The polarity of the supply line A voltage is compared with the polarity of the voltage across the first motor winding 11, while the associated pair of SCR's 16 are non-conducting at step 170. This is achieved by comparing the output of the two differential amplifiers 22 and 24 representing the motor winding voltage and the supply line voltage polarities respectively. An indication of whether these polarities are the same or opposite is stored temporarily within the microcomputer's internal memory. The motor controller 20 then delays for an interval equal to the electrical phase angle γ. When this delay has elapsed, the controller 20 then fires the SCR's 16 and 17 for supply lines A and B respectively, by sending trigger pulses on output lines 26 and 27 at step 172.

> Once the SCR's have been triggered, the program advances to step 174 where microcomputer 21 checks the results of the voltage comparison that had been performed at step 170. A stall condition of the motor is indicated by the supply line and motor winding voltages having opposite polarities while the SCR's 16 non-conducting,. The execution of the control program remains in period 4 until such a stall is detected. Therefore, if a stall is not detected at step 174, the program execution loops back to step 160 where the value for γ is increased in order to delay the triggering of the SCR's by a slightly greater amount.

Once the motor enters the stall condition, the execution of the stopping routine advances to step 176 where an initial value for the control angle reference $θ_{REF}$ is determined using the equation $θ_{REF} = φ + Kγ$. The program then enters period 5 of the motor controller's operation.

This latter period commences at step 178 where the microcomputer waits for an interrupt signal from the zero crossing detector 30, indicating that the A supply line voltage has gone through zero volts. The time at which the zero crossing occurs is recorded as variable $T_{zc}$ at step 180. The program execution then waits at step 182 for an indication from the zero current sensor 50 that the current through supply line A has gone to zero and that the first pair of SCR's 16 has turned off. The microcomputer records the interval between the zero voltage and zero current crossings by setting the variable φ to the difference between the present value of the timer and variable $T_{zc}$ at step 184. The relative time at which the current goes to zero also is recorded as variable $T_{zI}$.

The value for the control angle θ then is calculated at step 186 using to the equation $θ = φ + Kγ$, in which K equals 0.5, for example, during the stopping mode. It should be noted that the value of φ was just determined during the present voltage half cycle, while the value used for γ was determined during the previous half cycle. Next the microcomputer 21 derives the error value representing the difference between the calculated value for control angle θ and the reference $θ_{REF}$, at step 188. The error value then is used to determine whether variable γ should be altered, and if so, by what amount. When the reference value $θ_{REF}$ is greater than the control angle θ, a negative error results indicating that γ should be increased at step 190. Alternatively, if the error has a positive value, γ is decreased at step 192. In either case, γ can be altered by one-eighth or one-sixteenth of the error value. If the reference value $θ_{REF}$ and the control angle 674 are equal, the program execution advances directly from step 188 to step 194 without altering variable γ.

Thereafter the microcomputer 21 waits at step 194 until its internal timer indicates that an interval equal to γ has elapsed from time $T_{zI}$ when the current when to zero. At that time, SCR pairs 16 and 17 for supply lines A and B are triggered. Then at step 196, the reference $θ_{REF}$ is incremented. The flowchart of the stop mode is indicated as altering the value for $θ_{REF}$ during every pass through the portion for period 5. However, in order to provide a more gradual deceleration of the motor, $θ_{REF}$ may be altered less frequently, for example only once during every one to ten cycles of the supply voltage Va.

The new value of γ is tested, at step 198, to determine if it corresponds to 75 electrical degrees of the voltage cycle. If variable γ has not attained a value equivalent to 75 electrical degrees, the program execution loops back to step 178 to continue the application of electricity to slow the motor 10. After repeated passes through the program loop for period 5, variable γ will have an equivalent value at least equal to 75 electrical degrees, at which point the motor speed will have slowed to substantially zero, as indicated at time $T_6$ on FIG. 3. When this occurs, the program execution terminates and further electricity is not applied to the motor. Soon thereafter, the load torque will bring the motor to a complete stop.

The use of the control angle θ to regulate the triggering times of the SCR's prevents abrupt changes in motor torque while the motor is slowing. As a result when this technique in applied to pump motor, sudden surges of the fluid are eliminated during motor stopping as well a starting.

We claim:

1. An apparatus for controlling the torque of an electric motor which is supplied by a three-phase source of alternating electricity having a neutral node, said apparatus comprising:

three switch means, each coupling a different phase of the source to a different winding of the electric motor;

a first voltage sensing means coupled to one of the phases of the source of electricity for providing a first indication when the voltage in the one phase makes a zero voltage crossing;

a current sensing means for detecting when the magnitude of alternating current flowing from the one phase of the source to the motor goes to zero;

means, responsive to said first voltage sensing means and to said current sensing means, for measuring a time interval φ between when the voltage makes a zero crossing and when the magnitude of the alternating current goes to zero;

means for defining a reference value $\theta_{REF}$ and for altering the reference value in a predefined manner;

means for calculating a control value $\theta$ according to the equation $\theta = \phi + K\gamma$, where K is a positive number and where $\gamma$ corresponds to the length of a previous time interval during which said switch means for the one phase was non-conductive;

means for comparing the control value $\theta$ to the reference value $\theta_{REF}$;

means for altering the value for $\gamma$ in response to said means for comparing; and means for activating said switch means at times determined in response to the altered value for $\gamma$.

2. The apparatus as recited in claim 1 wherein said means for altering decreases the value of $\gamma$ when the control value $\theta$ is greater than the reference value $\theta_{REF}$, and increases the value of $\gamma$ when the cOntrol value $\theta$ is less than the reference value $\theta_{REF}$.

3. The apparatus as recited in claim 2 wherein said means for altering changes a previous value of $\gamma$ by an amount proportional to the difference between the control value $\theta$ and the reference value $\theta_{REF}$.

4. The apparatus as recited in claim 2 wherein said means for defining a reference value $\theta_{REF}$ occasionally decrements the reference value during starting of the motor.

5. The apparatus as recited in claim 2 wherein said means for defining a reference value $\theta_{REF}$ occasionally increments the reference value during stopping of the motor.

6. The apparatus as recited in claim 1 wherein said means for activating activates said switch means for a given phase at a time substantially equal to the interval corresponding to the altered value of $\gamma$ from the point in time when the magnitude of the current from the given phase goes to zero.

7. The apparatus as recited in claim 1:
wherein said first voltage sensing means also provides a second indication of a polarity of the voltage in the one phase with respect to the potential of the neutral node; and
further comprising a second voltage sensing means for providing a third indication of a voltage polarity at a winding of the motor with respect to the potential of the neutral node; and a means for comparing the second and third indications to determine when the motor is in a stall condition.

8. An apparatus for controlling the torque of an alternating current electric motor comprising:
a switch means, coupling the electric motor to a source of alternating electricity, said switch means being of a type which is conductive from the moment of application of a trigger pulse until the magnitude of alternating current therethrough goes to zero;
voltage sensing means for providing a first indication when the voltage of the source makes a zero voltage crossing;
detecting means for sensing when said switch means becomes non-conductive;
means, responsive to said voltage sensing the means and to said detecting means, for measuring a first interval $\phi$ between when the voltage makes a zero crossing and when said switch means becomes non-conductive;

means for defining a reference value $\theta_{REF}$ and for altering the reference value in a predefined manner;

means for calculating a control value $\theta$ according to the equation $\theta = \phi + K\gamma$, where K is a positive number and where $\gamma$ has a value that corresponds to the length of a previous time interval during which said switch means was non-conductive;

means for producing an error signal representing the difference between the control value $\theta$ and the reference value $\theta_{REF}$;

means for applying a trigger pulse to said switch means at a time determined in response to the error signal; and means for redefining the value of $\gamma$ in response to a second interval between when said switch means became non-conductive and when the trigger pulse is applied to said switch means.

9. The apparatus as recited in claim 8 wherein the trigger pulse is applied to said switch means earlier during each half cycle of the voltage from the source than a previous trigger pulse, when the control value $\theta$ is greater than the reference value $\theta_{REF}$, and later during each half cycle than a previous trigger pulse, when the control value $\theta$ is less than the reference value $\theta_{REF}$.

10. The apparatus as recited in claim 9 wherein said means for defining a reference value $\theta_{REF}$ occasionally decrements the reference value during starting the motor.

11. The apparatus as reCited in claim 9 wherein said means for defining a reference value $\theta_{REF}$ occasionally increments the reference value during stopping the motor.

12. The apparatus as recited in claim 8 further comprising:
means for producing a second indication of a polarity of the voltage from the source with respect to a reference node;
means for producing a third indication of the polarity of a voltage at a winding of the motor with respect to a reference node;
means for comparing the second and third indications to determine when the motor is in a stall condition.

13. The apparatus as recited in claim 12 wherein said apparatus is enabled only when the motor is in a stall condition.

14. A method for controlling the torque of an electric motor that is coupled by a switch means to a source of alternating voltage and current, the switch means being of a type which is conductive from when a trigger pulse is applied until the magnitude of alternating current therethrough goes to zero, said method comprising repeatedly executing the steps of:
(a) measuring a phase difference $\theta$ between the alternating voltage and current from the source;
(b) defining a reference value $\theta_{REF}$;
(c) calculating a control value $\theta$ according to the equation $\theta = \phi + K\gamma$, where K is a positive number and where $\gamma$ corresponds to the length of a previous interval during which the switch means was non-conductive;
(d) producing an error signal representing the difference between the control value $\theta$ and the reference value $\theta_{RREF}$;
(e) altering the value of $\gamma$ in response to the error signal; and
(f) applying a trigger pulse to the switch means at the end of an interval substantially equal to the altered value of $\gamma$ from when the alternating current from the source has a zero magnitude.

15. The method as recited in claim 14 wherein said altering step decreases the value for $\gamma$ when the control value $\theta$ is greater than the reference value $\theta_{REF}$, and increases the value for $\gamma$ when the Control value $\theta$ is less than the reference value $\theta_{REF}$ 16. The method as recited in claim 14 wherein said step of defining a reference value $\theta_{REF}$ occasionally decrements the referenCe value when starting the motor.

17. The method as recited in claim 14 wherein said step of defining a reference value $\theta_{REF}$ occasionally increments the reference value when stopping the motor.

18. The method as recited in claim 14 further comprising applying a trigger pulse to the switch means at a fixed interval from when the alternating current from the source has a zero magnitude, for a period of time prior to executing steps a-f.

19. The method as recited in claim 14 when used to start a motor further comprising:
    sensing a polarity of the alternating voltage from the source with respect to a reference node; and
    sensing a polarity of a voltage between a winding of the motor and the reference node when current from the source is not flowing through that winding;
    comparing the polarity of the alternating voltage from the source with the polarity of the voltage between a winding of the motor and the reference node to determine when the motor is in a stall condition;
    when the motor is not in a stall condition repeatedly performing the following steps in place of steps a-f:
        detecting when the magnitude of alternating current flowing from the source to the motor goes to zero;
        applying a trigger pulse to the switch means at a given interval from when the magnitude of alternating current flowing from the source to the motor goes to zero; and
        occasionally decreasing the length of the given interval.

20. The method as recited in claim 14 when used to stop a motor further comprising, prior to executing steps a-f, repeatedly executing the following steps until a motor stall condition is detected:
    (g) detecting when the magnitude of the alternating current flowing from the source to the motor goes to zero;
    (h) sensing a polarity of the voltage from the source with respect to a reference node; and
    (i) sensing a polarity of the voltage between a winding of the motor and the reference node when current from the source is not flowing through that winding;
    (j) comparing the two sensed voltage polarities to detect when the motor is in a stall condition;
    (k) applying a trigger pulse to the switch means at a given interval from when the alternating current magnitude goes to zero; and
    (l) occasionally increasing the length of the given interval.

21. The method as recited in claim 20 further comprising upon a transition from steps (g) through (l) to steps (a) through (f) setting the initial value of $\theta$ to correspond to the length of the given interval.

22. The method as recited in claim 14 when used to stop a motor further comprising terminating the performance of the method when the value of $\gamma$ reaches a defined limit.

* * * * *